Nov. 10, 1925.  L. C. STEELE  1,560,808
SHEARING MACHINE FOR METAL SHEETS
Filed Oct. 11, 1922    2 Sheets-Sheet 1
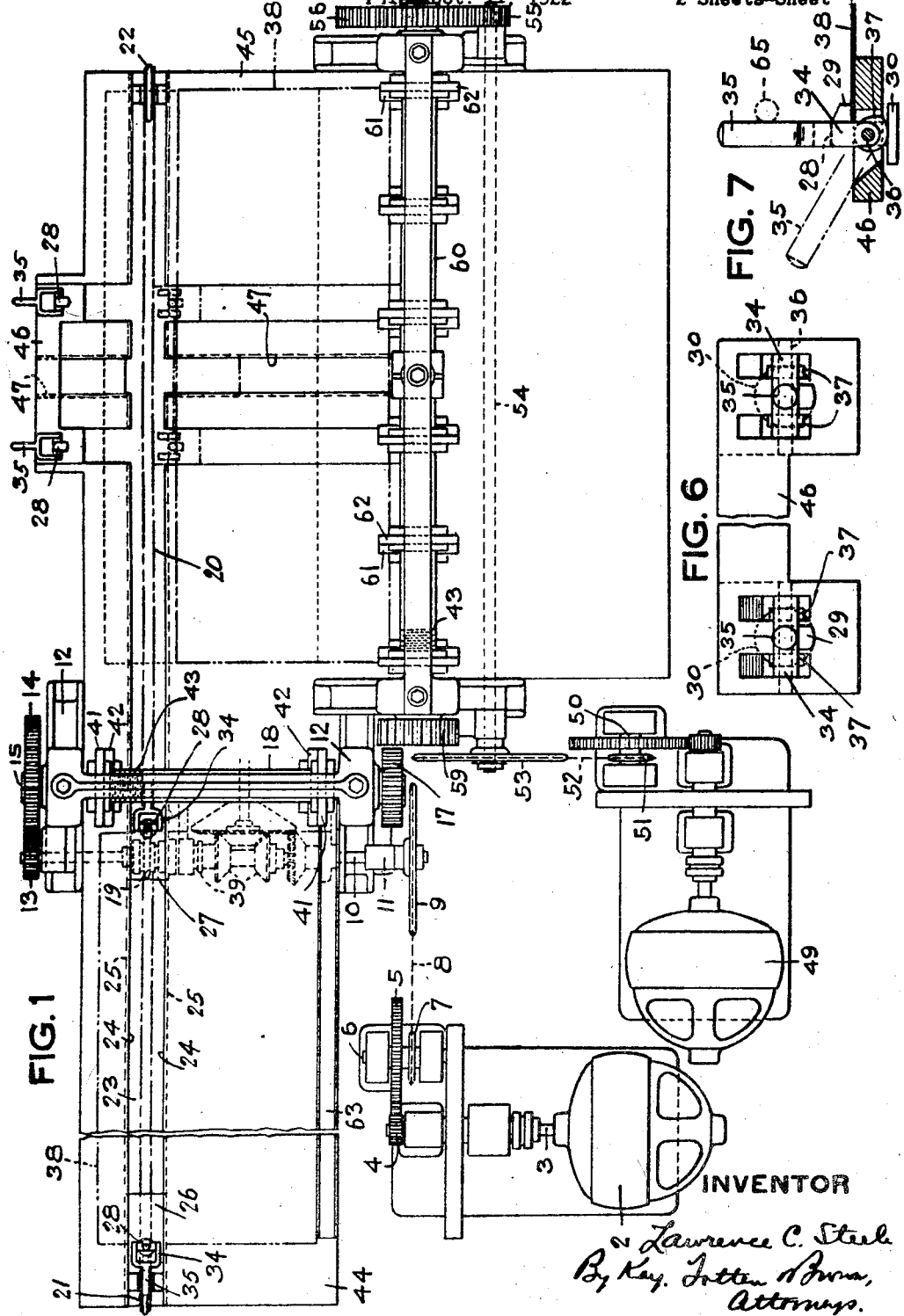
INVENTOR
Lawrence C. Steele
By Kay, Totten & Burns,
Attorneys.

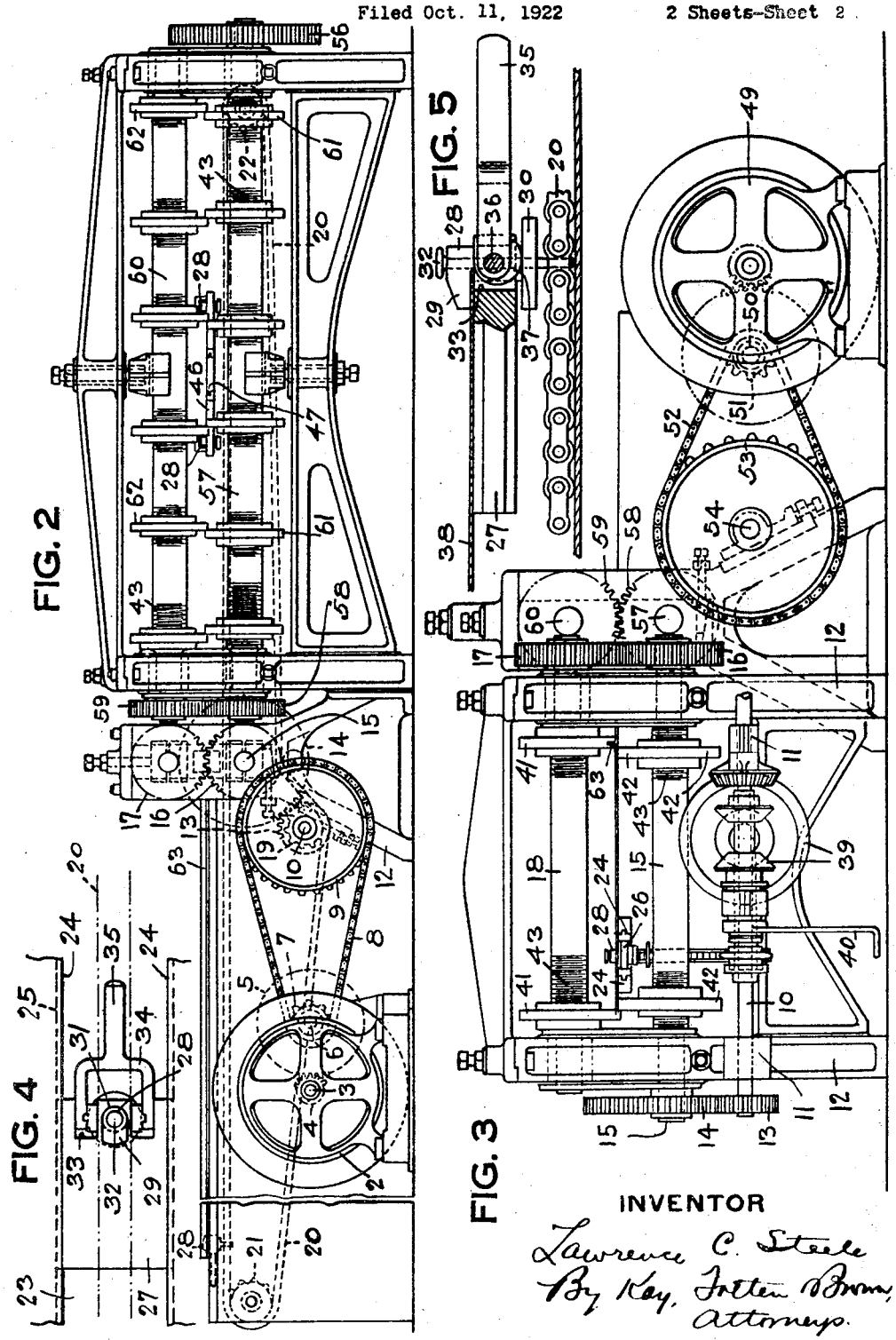

Patented Nov. 10, 1925.

1,560,808

UNITED STATES PATENT OFFICE.

LAWRENCE C. STEELE, OF PITTSBURGH, PENNSYLVANIA.

SHEARING MACHINE FOR METAL SHEETS.

Application filed October 11, 1922. Serial No. 593,800.

*To all whom it may concern:*

Be it known that I, LAWRENCE C. STEELE, a citizen of the United States, and resident of Pittsburgh, in the county of Allegheny and State of Pennsylvania, have invented a new and useful Improvement in Shearing Machines for Metal Sheets; and I do hereby declare the following to be a full, clear, and exact description thereof.

My invention relates to a machine for shearing metal sheets, plates and other flat material.

The object of my invention is to provide a machine by which the edges of the sheets will be uniformly and accurately sheared or trimmed, and at the same time to provide for the cutting of the sheet into suitable sizes after the longitudinal edges have been sheared, the idea being to move the sheet lengthwise and continuously through the cutters to remove the marginal portions, and then move the sheet in a direction at right angles to the first movement through the cutters to divide the sheet up into desired sizes.

In the accompanying drawings, Fig. 1 is a plan view of my improved machine; Fig. 2 is a side elevation; Fig. 3 is a front view; Fig. 4 is an enlarged plan view of the clamping mechanism; Fig. 5 is a view of a portion of the chain showing the clamping mechanism in operation; Fig. 6 is a plan view of the cross head and clamps for moving the plate to the cross cutters; and Fig. 7 is a detail of the clamping mechanism on the cross head for clamping the plate in position.

In the drawings, the numeral 2 designates a suitable motor with the shaft 3 provided with the pinion 4 which meshes with the gear 5 on the counter-shaft 6. Mounted on the shaft 6 is the sprocket-wheel 7, and a chain 8 passing around said sprocket-wheel engages the sprocket-wheel 9 on the shaft 10. The shaft 10 is mounted in suitable bearings 11 in the housing 12. The pinion 13 on the shaft 10 meshes with the gear-wheel 14 on the shaft 15 mounted in suitable bearings in said housing 12. The shaft 15 has the gear 16 meshing with the gear 17 on the shaft 18.

Mounted on the shaft 10 is the sprocket-wheel 19 which drives the sprocket-chain 20 passing around the sprocket-sheaves 21 and 22, said chain passing through the trough 23. The sides 24 of the trough 23 have the grooves 25 formed therein with which the blocks or cross-heads 26 and 27 engage, said blocks being adapted to slide back and forth in said grooves.

Connected to the chain 20 are suitable clamping devices, that are shown as consisting of the clamping member 28 with the nose portion 29 and the base or abutment 30, said clamping member being swiveled in the opening 31 formed in the block 27. The pin 32 passes through the clamping member 28, said pin being connected to the links of the chain 20 so that the said clamping member is carried by said chain together with the block 27. The block 27 is slotted, as at 33, to receive the ends of the yoke 34 provided with the handle 35. The yoke is mounted to swing on the pins 36 in the block 27. The yoke also carries the cams 37 which are adapted to bear against the base 30 of the clamping member. It will be apparent that when the handle 35 is thrown down into horizontal position, as indicated in Fig. 5, the nose portion 29 of the clamping member will be forced into engagement with the sheet 38 and will act to clamp said sheet securely to the block 27. It will be understood that the block 26 is provided with the same form of clamping mechanism as that described in connection with the block 27, so that the sheet may be clamped at opposite ends, as will more fully hereinafter appear.

In order to provide for the reversal of the movement of the chain 20, suitable gear-reversing mechanism 39 is employed on the shaft 11, and a reversing lever 40 is provided to operate said reversing gear mechanism.

Mounted on the shafts 15 and 18 are circular cutters 41 and 42, and to provide for the adjustment of said cutters the shafts 15 and 18 are threaded as at 43. In this manner provision is made for the adjustment of the cutters according to the width of the sheet or the amount to be cut therefrom.

During the cutting operation a sheet is supported on the table 44 and passes therefrom to the table 45.

The cross-head 46 is mounted to move transversely of the table 45 and said table has the guide 47 formed therein to receive the slide 47 on said cross-head.

The cross-head 46 is provided at one end with clamping members, being similar to those already above described, and the same reference numerals will apply, the only difference being that in the arrangement of the cams in these clamping members the handles will be in a vertical position when not clamping instead of in horizontal position, as in the case of the clamping devices first described and as clearly illustrated in Fig. 7.

A motor 49 is geared up in the usual manner to drive the shaft 50 which carries the sprocket-wheel 51 engaged by the chain 52 which passes around the large sprocket-wheel 53 on the shaft 54. The pinion 55 on the shaft 54 meshes with the gear 56 on the shaft 57, and a gear 58 on the shaft 57 meshes with the gear-wheel 59 on the shaft 60.

The shafts 57 and 60 carry cutters 61 and 62, and said shafts are likewise screw threaded so as to provide for the adjustment of the cutters 61 and 62 for the cutting of different sized sheets.

In the operation of my improved shearing machine, the sheet to be sheared is fed in sidewise of the table 44. A suitable gauge 63 may be provided to limit the movement of the sheet and bring it in proper position with reference to the cutters. When the sheet has been adjusted in position on the table 44 the clamping members are operated, the handles 35 being thrown down to horizontal position, as shown in Fig. 5, so that the nose portions 29 will bind the sheet at opposite ends securely in position between said clamps, and the blocks 26 and 27. The motor 2 is then started and the chain 20 travels forward carrying the sheet through the cutters 41 and 42 which cut off the margins of the sheet as the sheet moves through the same. The cutters will feed the sheets and travel a little faster than the chain. This cutting is a continuous operation and is accurately done due to the fact that the sheet is clamped securely at both ends against displacement, and as the sheet passes through the cutters it is delivered on to the table 45, and when in proper position on said table the sheet is released from the clamping devices and the chain 20 reversed, whereupon the cross-head 46 is advanced by hand to bring the clamping members carried thereby in position to secure the plate to said cross-head, whereupon said cross-head is moved transversely of the table, and the sheet is advanced into the cutters 61 and 62 to be cut into the desired sizes. As soon as the sheet enters the cutters it will be advanced by said cutters, and a stop 65 is provided in the path of the handles 35 of the clamping members, so that when said handles strike the stop 65 the ends will be moved down to the position indicated in dotted lines, Fig. 7, so as to release the clamping devices from the sheet. In this manner provision is made for the automatic release of the clamping devices as the sheet is fed transversely of the table through the cutters 61 and 62.

By my invention I provide a very simple and efficient form of mechanism for shearing the margins of the sheets and for bringing them in position to be immediately cut into the desired sizes, the operation being a continuous one, doing away with the extra handling of the sheets, and providing for the uniform and accurate cutting with the use of a minimum amount of labor.

What I claim is:

1. In a machine for shearing sheets, plates, etc., the combination with a suitable frame, of an endless chain, means for advancing said chain and reversing same, clamping devices carried by said chain for clamping the opposite ends of the sheet to said chain, and cutters in the path of said sheet.

2. In a machine for shearing sheets, plates, etc., the combination with a suitable frame, of an endless chain, means for driving same, a guide in said frame, a block engaging said guide, a pin connected to said chain, a clamping member swiveled on said pin having a projecting portion adapted to engage the sheet, a swinging cam arm on said block, and an abutment on said clamping member adapted to be engaged by said cam arm, and cutting devices.

3. In a machine for shearing sheets, plates, etc., the combination with a sheet supporting table, of a carriage, means for moving said carriage, means movable in the table for clamping the sheet at its opposite ends to said carriage, and cutters in the path of movement of said sheet, to either side of said clamping means.

4. In a machine for shearing sheets, plates, etc., the combination with a suitable sheet supporting table, of a carriage, means for advancing the carriage or for reversing the same by a continuous motion, means movable in the table for clamping the sheet at its opposite ends to said carriage, and cutters in the path of movement of said sheet, to either side of said clamping means.

5. In a machine for shearing sheets, plates, etc., the combination with a suitable sheet supporting table, of an endless chain, means for driving same, clamping devices slidable in the table and adapted for securing the sheet at its opposite ends, connections between said clamping devices and said chain, and cutters in the path of movement of said sheet.

6. In a machine for shearing sheets, plates, etc., the combination with a suitable sheet supporting table, of an endless chain, means for driving said chain, a guide in said table, a block slidable in said guide, a clamping member carried by said block, a pin on said chain on which said clamping member is mounted, a swinging cam arm on said block, and an abutment on said clamping member engaged by said cam arm, and cutting devices.

7. In a machine for shearing sheets, plates, etc., the combination with a suitable sheet supporting table, of means for moving the sheet on the table comprising a carrier and including movable means independently slidable on said table for clamping the opposite ends of the sheet between the longitudinal edges thereof, cutters for shearing the edges of the sheet, a transversely movable member slidable through the table and disposed beyond said cutting devices, clamping members carried by said transversely movable member adapted to engage the sheet at one side, and rotary cutters adapted to cut the sheet into desired sizes.

8. In a machine for shearing sheets, plates, etc., the combination with a suitable sheet supporting table, of a carriage, clamping devices slidable in said table and adapted to engage the opposite ends of the sheet, means for connecting said clamping devices to said carriage, transversely spaced cutters in the path of the sheet, a transverse guide in the table beyond said cutters, a cross-head engaging said guide, and clamping devices carried by said cross-head adapted to engage one side of the sheet, and rotary cutters in the path of said sheet.

In testimony whereof I, the said LAWRENCE C. STEELE, have hereunto set my hand.

LAWRENCE C. STEELE.